United States Patent [19]
Mead

[11] 3,773,557
[45] Nov. 20, 1973

[54] SOLID STATE BATTERY
[75] Inventor: Ralph T. Mead, Kenmore, N.Y.
[73] Assignee: The Wurlitzer Company, Chicago, Ill.
[22] Filed: Mar. 1, 1972
[21] Appl. No.: 230,923

[52] U.S. Cl. ........ 136/6 LF, 136/83 R, 136/100 M, 136/111
[51] Int. Cl. .......................................... H01m 43/00
[58] Field of Search ..................... 136/83, 100, 153, 136/6 L, 6 LF, 6 A, 137, 134, 166, 20, 111, 107, 14

[56] References Cited
UNITED STATES PATENTS

| | | | |
|---|---|---|---|
| 2,894,052 | 7/1959 | Evans | 136/83 R |
| 2,894,053 | 7/1959 | Louzos | 136/87 |
| 3,443,997 | 5/1969 | Argue et al. | 136/83 R |
| 3,476,605 | 11/1969 | Owens | 136/83 R |
| 3,476,606 | 11/1969 | Owens | 136/83 R |
| 3,598,654 | 8/1971 | Hruden | 136/83 R |
| 3,653,968 | 4/1972 | Louzos | 136/83 R |
| 3,660,163 | 5/1972 | Moser | 136/83 R |
| 3,674,562 | 7/1972 | Schneider et al. | 136/83 R |
| 3,413,154 | 11/1968 | Rao | 136/100 |
| 3,003,017 | 10/1961 | Weininger | 136/100 |

Primary Examiner—Anthony Skapars
Attorney—Roy H. Olson et al.

[57] ABSTRACT

A solid state battery construction is disclosed wherein the anode structure can be formed from one of the compounds selected from the group consisting of lithium, lithium and magnesium, lithium and calcium, or lithium, magnesium and calcium. The cathode is formed of conductive metal such as stainless steel and nickel engaging an ionic conductive layer formed of one or more of the compounds selected from the group consisting of rubidium iodide, cesium iodide, tetramethyl ammonium iodide and mixtures of iodine and non-ionic organic compounds such as pyrene or polyvinylpyrene or ion exchange resins such as polyvinylpyridine. The battery structure utilizes two layers of lithium or lithium compounds which sandwich a screen member of nickel to form the conductive contact with the anode.

15 Claims, 10 Drawing Figures

Patented Nov. 20, 1973 3,773,557
2 Sheets-Sheet 1
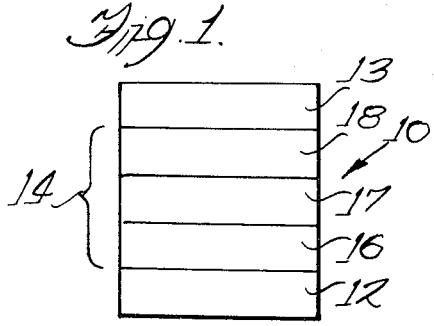
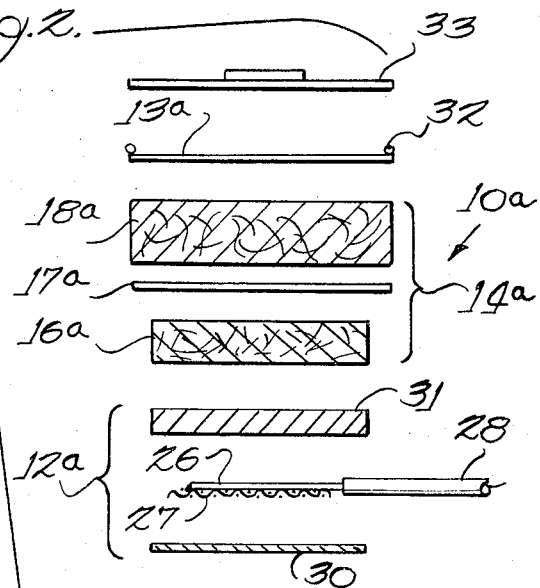
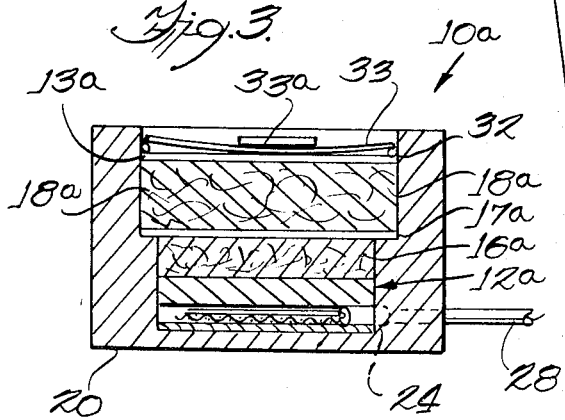
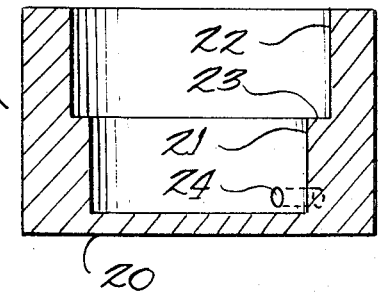
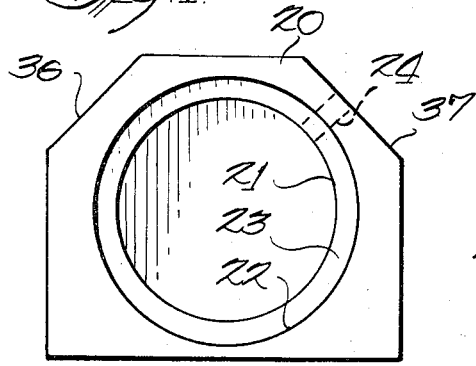
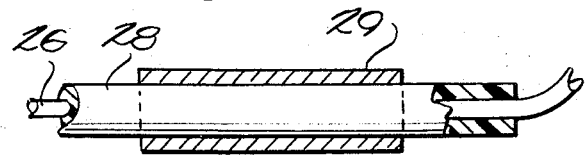

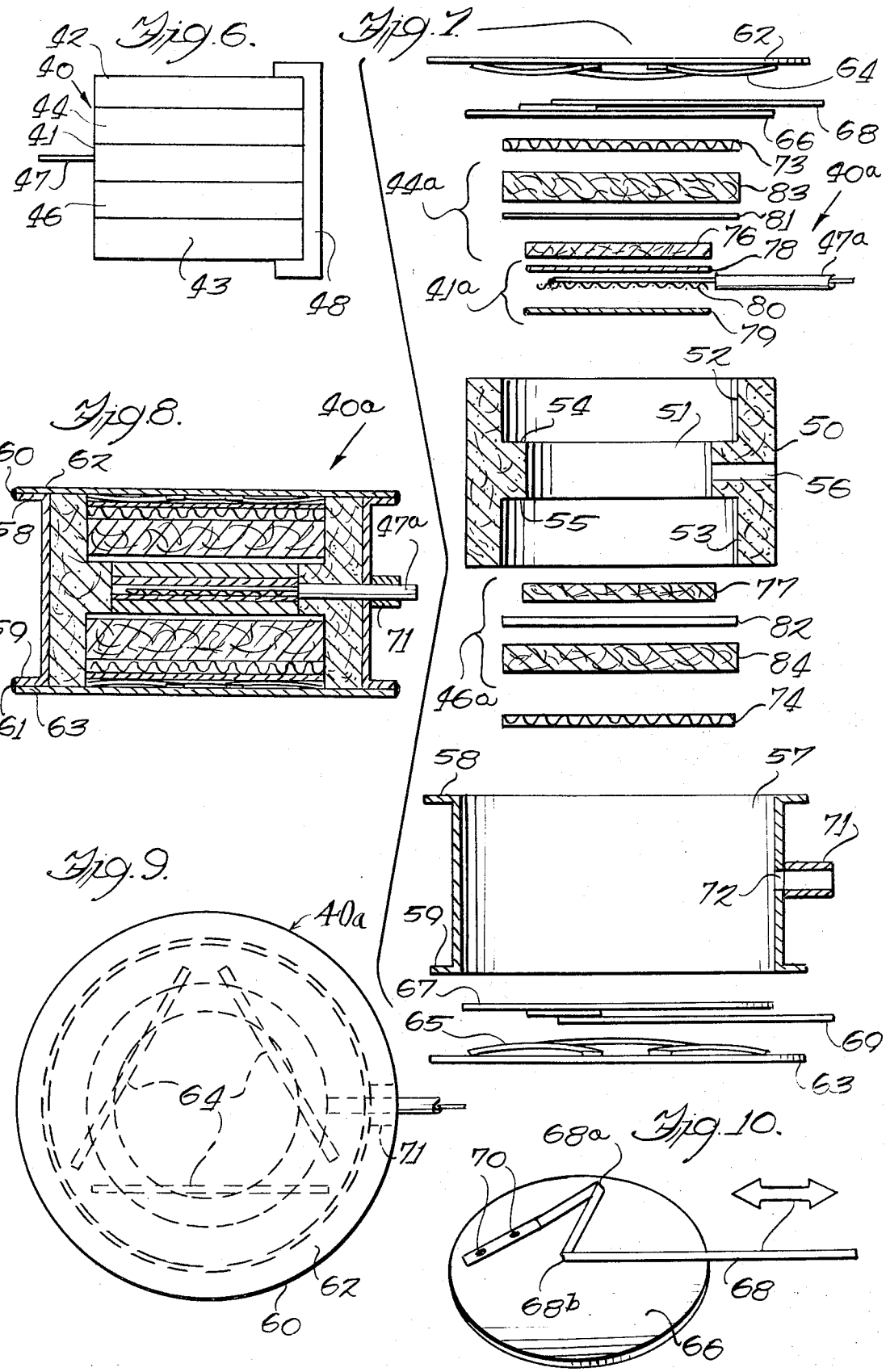

3,773,557

SOLID STATE BATTERY

BACKGROUND OF THE INVENTION

This invention relates generally to a battery cell construction, and more particularly to a battery cell construction for use in implantation into the human body to operate an electronic device such as a heart stimulating Pacemaker or the like.

Electronic devices for implantation into the human body are relatively well known and of important use in our modern medical society. Such electronic devices may include pulsing circuits commonly referred to as heart Pacemakers which electronically stimulate the heart at regular intervals or will provide a stimulating pulse upon sensing that the heart will not produce its own electromuscular pulse.

Electronic devices such as the Pacemaker are dependent on a self-contained power source to control the energization of the circuit. This power source is generally a small battery cell, or cells connected in parallel or series, to provide the necessary power for a relatively long period such as 1 year or so, while the unit is implanted into a person's body. However, many battery cells heretofore utilized for such purpose have encountered problems which may be fatal to the person using the device. For example, a catastrophic failure of the battery cell almost always produces a condition that kills the person before a new Pacemaker or battery cell can be put in place. Even when replacing a battery cell of this general type it must be a fully charged or fresh battery when installed so that it will provide a maximum life span and can have a predictable life expectancy so that the person can have a new battery replaced at prescribed intervals. The life of batteries presently used in Pacemaker circuits is about one year. While this is suitable, it would be desirable to have a longer battery life, but most importantly, the exact predictability of battery failure must be known.

When utilizing battery construction having lithium anodes there is a problem of obtaining unoxidized lithium surface to come in contact with a suitable electrode member during construction. Furthermore, lithium tarnishes easily in air and its resistivity in a battery construction may increase to an undesirable level to minimize current flow from the battery cell. Furthermore, when constructing a battery cell that has an indefinite or extremely long shelf life it is desirable to minimize electronic conductivity within the cell so that all current flow through the cell proper is of an ionic nature. This then maintains the cell in absolute dormancy when no load is connected to the exterior leads thereof. Such cells will have an indefinite shelf life because only external current flow will cause ionic internal flow in the cell and thus deplete the cell construction.

SUMMARY OF THE INVENTION

Accordingly, it is an object of this invention to provide a battery cell construction which has little or no electron current flow within the battery cell. Another object of this invention is to provide a lithium anode cell construction which adds improved contact between the lithium anode components and the conductive elements connected thereto.

Still another object of this invention is to provide a lithium cell construction wherein the lithium tarnish rate in air is minimized and wherein lithium will have a relatively low electrical resistance during the discharge of the battery cell.

Briefly, the battery cell construction of this invention utilizes a mechanical design concept that permits the active use of two major surfaces of a lithium anode construction. This involves pressing lithium discs or sheets on two sides of a metal screen, preferably nickel, and sealing the edges of the lithium about the screen by pressure contact of about 400 psi. The nickel screen has an anode lead or connector welded thereto and extends through the housing of the battery thus forming the anode connection to the external circuit.

In one aspect of the invention a dopant such as magnesium or calcium or both is combined with the lithium anode to both reduce the tarnish rate of the lithium in air and to reduce the resistivity of the lithium iodide layer which is developed during the discharge operation of the battery.

The intermediate layers of the battery cell are formed of a complex of iodine and an ion exchange resin such as polyvinylpyridine that contains approximately 89 percent iodine acquired by natural absorption. In accordance with this invention the polyvinylpyridine obtains the iodine at a reaction temperature of about 250°F or more. The polyvinylpyridine is vacuum dried prior to reacting with the iodine to insure a minimum of moisture in the resin-iodine complex. The elevated temperature causes a maximum natural absorption of the iodine into the polyvinylpyridine. A complex of iodine and non-ion exchange resins such as pyrene and/or polyvinylpyrene can be used as the depolarizer layers, thus replacing the polyvinylpyridine.

An iodine reservoir is utilized in the battery construction of this invention so that the internal resistance of the battery can be controlled. For example, the increase in internal resistance, which occurs during discharge, is a combination of the resistance of the lithium iodide layer produced plus the increase in resistance of the iodine complex which occurs as the iodine is consumed during ionic current flow. By utilizing the iodine reservoir as disclosed herein, the iodine level of the iodine complex is maintained during the entire discharge life of the battery. The iodine reservoir consists primarily of a mixture of iodine and carbon, or graphite, positioned between the cathode collector and the iodine complex. Depletion of the iodine from the reservoir layer has no unfavorable effect on cell resistance or cell life and reduces or minimizes any shrinkage defects due to the net loss of volume of the ionic reaction between the iodine and lithium during the discharge operation.

A barrier layer is positioned between the reservoir layer and the polyvinylpyridine iodine complex layer, this barrier layer preferably being formed of a thin fiberglass sheet having a coating of ion exchange resins and salts such as rubidium and cesium iodide. This barrier layer has two primary purposes, one being to facilitate assembly of the cell by providing a retainer to hold the iodine complex in position while adding the iodine and carbon mixture, and the other purpose is to reduce the iodine migration rate between the iodine carbon mixture and the iodine complex.

To substantially completely eliminate self discharge of the battery during self life, electronic conductivity within the battery is minimized. All conduction within the battery is ionic and occurs only during actual use, i.e., when a given load is connected to the external terminals of the battery to draw current therefrom. To minimize electronic conduction and improve ionic conduction magnesium may be used as a dopant in the lithium. Also, the use of the barrier layer and the incorporation of compounds such as cesium iodide, rubidium iodide or tetramethyl ammonium iodide provide a battery cell construction with improved characteristics.

The physical construction of a battery cell formed in accordance with this invention provides an optimum energy density and minimum assembly cost with still extremely high reliability of such cell for use in implantation in human patients. A round case permits maximum anode surface area for the particular size involved. The sealing of the battery cell can be accomplished by pressure bonding the anode to a teflon sleeving structure or by compression of the lithium in an insulating ring or an insulating body.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 1 is a schematic view showing the layers of primary concern in a battery cell construction of this invention;

FIG. 2 is an exploded view of a single battery cell utilizing the concepts of this invention;

FIG. 3 is an assembled cross sectional view of the battery cell of FIG. 2;

FIG. 4 is a top view showing the configuration of a particular housing construction of the battery cell of FIGS. 2 and 3;

FIG. 5 illustrates an insulating sleeve through which the anode connection is made through the battery cell housing;

FIG. 6 is a schematic view showing an alternate form of the battery cell construction of this invention;

FIG. 7 is an enlarged exploded view of the alternate form of battery cell constructed as shown in FIG. 6 and wherein two battery cells are formed in a single housing utilizing a common lithium anode structure and between the two cells;

FIG. 8 is a sectional view of an assembled battery cell of FIG. 7;

FIG. 9 is a top view of the battery cell of FIG. 8; and

FIG. 10 shows the electrical contact provided on one of the end plates of the battery of FIGS. 7 and 8.

DESCRIPTION OF THE ILLUSTRATED EMBODIMENTS

Referring now to FIG. 1 a basic battery cell construction of this invention is designated generally by reference numeral 10 and is shown in schematic form. The battery cell 10 includes an anode means 12 preferably formed of one or more lithium or lithium compound layers. The lithium may include a dopant of magnesium or calcium which serves to both reduce the tarnish rate of the lithium in air and to reduce the resistivity of the lithium iodide layer which develops during discharge of the battery cell. A cathode 13 is formed at the other end of the battery cell 10 and is preferably of stainless steel and nickel compound having at least 10 percent nickel. An ion conductive combination is designated generally by reference numeral 14 and may form one or more discrete layers of ion current carrying compounds. In the illustrated embodiment the ion conductive combination 14 includes three finite composition layers.

The first layer of the combination 14 is a layer 16 which forms an organic-iodide complex which is made of iodine and a previously vacuum dried ion exchange resin such as polyvinylpyridine. Vacuum drying insures a minimum of moisture in the layer when the battery is assembled. Preferably, the polyvinylpyridine is impregnated to a maximum condition, this being in the order of about 60 to 95 percent iodine, and more specifically about 89 percent iodine, by natural absorption into the polyvinylpyridine as a result of heat reaction. The heat reaction in this instance is in the order of about 200°F to 300°F, preferably 250°F. A second layer 17 forms a barrier layer over the organic-iodine complex 16 and preferably consists of a coating of ion exchange resins and salts, i.e. rubidium iodide and cesium iodide, and/or tetramethyl ammonium iodide, on a fiberglass film. This barrier layer may have two purposes, one being to facilitate assembly of the cell, for example to hold the organic-iodine complex in position while adding the iodide and carbon mixture to follow, this being the reservoir layer 18. The reservoir layer 18 is the third layer in the combination 14 and is comprised of a mixture, hereinafter referred to as the mix, of iodine and carbon, or graphite. In this instance the mix will contain approximately one part of carbon to two parts of iodine. This reservoir layer provides sufficient iodine to maintain the iodine level in the organic-iodine complex layer 16 during discharge of the battery cell. In one preferred embodiment the rubidium iodide and cesium iodide are of equal parts.

For a better understanding of one specific battery cell construction, reference is now made to FIGS. 2 and 3 which show a battery cell construction including a housing 20 of non-conductive material, the housing 20 being either a suitable ceramic or fiberglass unit. Here the housing 20 includes a first diameter bore 21 extending from the bottom of the housing to substantially the middle section thereof and a second diameter bore 22, being of a greater diameter than the bore 21, and thus forming an annular ridge 23 within the housing. An aperture 24 extends through the lower portion of the housing and communicates with the bore 21 to provide access of a conductor wire 26 which provides for anode connection to the external load.

The anode means 12a of FIGS. 2 and 3 correspond substantially to the anode means 12 of FIG. 1 and shows the specific structure thereof. Here the lead wire 26 is secured to a metal screen member 27, the screen 27 preferably being of nickel or the like. An insulated sleeve 28 is formed on the conductor 26 and passes through a sealable sleeve or jacket 29, FIG. 5, which can receive a glass seal that allows the entire internal portion of the battery to be moisture proof.

The anode means 12a further includes a thin disc or layer 30 of lithium, or lithium and magnesium or calcium composition, which is first inserted into the housing 20. Positioned over the thin disc 30 and over the nickel screen 27 is a second thicker disc or layer 31 of lithium. The two discs 30 and 31 of lithium are pressed together under a force of about four hundred pounds, more or less, to form the lithium substantially completely around and to the same configuration as the wire 30 and nickel screen 27 so that good electrical contact is at all times maintained between these components. The organic-iodine complex 16a is poured into the smaller diameter 31 to fill the remaining portion thereof and preferably extend slightly above the ridge 23. The layer 16a is formed of a pourable tar compound which may be heated to a temperature of 250°, more or less. As mentioned above, the organic-iodine complex may be formed of either an ion exchange resin, such as polyvinylpyridine which has approximately 89 percent iodine associated therewith by natural absorption due to the elevated temperature, or a non-ion exchange resin such as pyrene and/or polyvinylpyrene. However, in the latter case the iodine absorption mechanism may be different than that of the ion exchange resin.

The barrier layer 17a is formed of a thin film of fiberglass which is impregnated with ion exchange resins and salts such as rubidium iodide and cesium iodide. However, it will be understood that tetramethyl ammonium iodide together with mixtures of rubidium iodide, cesium iodide may be used in the barrier layer 17a.

A reservoir layer 18a is formed of a mixture of iodine and carbon, preferably in the quantities of one part carbon to two parts iodine. The reservoir layer 18a maintains the resistance of the cell at a substantially constant and low level during discharge of the battery cell by providing sufficient iodine which would otherwise be depleted from the iodine complex layer 16a. It has been noted that depletion of iodine from the reservoir layer 18a has no unfavorable effect on cell resistance and improves the operability of the cell over its usable life. The reservoir layer 18a also minimizes any shrinkage effect within the cell caused by a net loss in volume due to the reaction between the indium and lithium.

The cathode layer 13a may be a metal selected from the group consisting of stainless steel, stainless steel and nickel compound, nickel, titanium, gold, molybdenum, or gold and molybdenum compound. Preferably, the cathode plate 13a is a stainless steel containing nickel in an order of about 10 percent or more. However, any suitable metal having nickel in an amount of 10 percent or more can be used to advantage in accordance with this invention. After the battery cell 10a has been completely assembled a contact or cover plate 33 is positioned over the cathode 13a and comes in contact therewith about the central portion 33a thereof, this being shown in FIG. 3, and the cover plate 33 is secured in position by the use of an epoxy or other adhesive 32.

The particular configuration of the housing 20 is shown in FIG. 4 and is illustrated as being a substantially rectangular body having the bores 21 and 22 formed substantially centrally of the body. Two of the corners are flattened as shown by reference numerals 36 and 37, and the aperture 24 passes through the flat side 37 and into the interior of the housing 20 for receiving the lead 28, as shown in FIG. 3. The housing 20 of FIGS. 2, 3 and 4 can be encapsulated in a rubberized implantation unit such as a Pacemaker or it can be encapsulated in a stainless steel housing so as to completely eliminate the possibility of body moisture from passing through the housing and into the interior of the battery cell.

Referring now to FIG. 6 there is seen an alternate form of the battery cell construction of this invention. Here the battery cell is designated generally by reference numeral 40 and is a double ended cell having a central anode means 41 preferably of a lithium or a lithium magnesium compound structure. A pair of cathode means 42 and 43 are positioned at opposite ends of the battery cell 40 and are separated from the anode means 41 by a corresponding pair of ion conductive combinations 44 and 46. The ion conductive combinations 44 and 46 may be three layer arrangements 14 as shown in FIG. 1. A common lead 47 extends from the anode layer 41 for providing a negative polarity connection from the battery while the end cathodes 42 and 43 are connected together by a lead 44. It will be understood that the lead 44 may be simply a common conductive metal casing which connects the cathodes together.

Referring now to FIGS. 7, 8, 9 and 10 the alternate form of battery construction is shown in greater detail. A liner 50 is formed of either ceramic or fiberglass material or other such insulating material. The liner 50 has a first diameter bore 51 positioned substantially centrally thereof and includes a pair of diametrically opposed larger diameter bores 52 and 53 thus defining ridges 54 and 55. The ridges 54 and 55 serve the same function as the ridge 23 of FIG. 2. An aperture 56 passes through the liner 50 and provides means for receiving a conductor lead 47a which is the negative terminal connection to the battery cell.

The liner 50 is positioned within a stainless steel outer casing 57 which forms the housing and makes the battery completely moisture proof for implantation into a human body. The casing 57 includes a pair of end flanges 58 and 59 which extend radially outwardly to receive corresponding edges of end plates 62 and 63 and are then welded together along their circumferences as shown at 60 and 61, respectively as shown in FIG. 8. The end plates 62 and 63 are provided with leaf spring members 64 and 65, respectively, to provide interior pressure applying means for maintaining good electrical contact of the components within the battery cell 40a.

A pair of internal contact plates 66 and 67 engage the pressure springs 64 and 65, respectively, and a corresponding pair of resiliently mounted tabs 68 and 69 are electrically connected to their respective contacts by welded points. For example, in FIG. 10 the contact plate 67 is shown in greater detail and has the resiliently mounted tab 69 extending therefrom and spot welded to the end plate as shown by reference numeral 70. The tab 69 includes first and second bends 68a and 68b. The bends 68a and 68b allow the tab 68 resiliently to move inwardly and outwardly along the periphery of the contact plate 60 so that when the tab 68 is sandwiched between the flange 58 of the sleeve 57 and the end plate 62 it will not inadvertently break off during the welding operation along the circumference.

A sealable sleeve 71 is welded or silver soldered over an aperture 72 formed in the sleeve 57 so that the lead wire 47a can pass therethrough and be sealed therein by glass or the like. The pressure springs 64 and 65 of the respective end plates 62 and 63 urge the contact plates 66 and 67 into firm engagement with the interior components of the battery.

In the embodiment illustrated in FIGS. 7 and 8 the contact plates 66 and 67 engage layers of stainless steel fiber 73 and 74 which, in turn, are positioned over the respective ion conductive combinations 44a and 46a, respectively. The stainless steel fibers provide a multitude of electrical contact points for good connection between the contact plate and the ion layer.

The battery cell of FIG. 7 includes a pair of organic polymer-iodine complex layers 76 and 77 in direct contact with corresponding layers 78 and 79 of the anode structure means 41a. A stainless steel screen 80 is positioned between the lithium layers 78 and 79 to provide good electrical contact therewith. The lithium layers are firmly pressed together to conform substantially to the inner configuration of the screen thus exposing maximum area for electrical contact.

A pair of thin barrier layers 81 and 82 are in contact with the layers 76 and 77, respectively, and are formed substantially in the same manner as the barrier layer 17a of FIG. 2. Similarly, reservoir layers 83 and 84 are positioned next to the barrier layers 81 and 82, respectively, and against which the stainless steel fiber layers 73 and 74 are urged by the spring biased contact plates 66 and 67. The battery structure shown in FIGS. 7 and 8 is somewhat similar to that shown in FIGS. 2 and 3 the difference being that twice the battery cell capacity is achieved since both sides of the anode structure 41a are exposed to an iodine complex layer.

The polyvinylpyridine used to form the layers 16a, 76 and 77 are ionic resins designated by the part No. PP-2000 and obtained from Ionac Chemical Company, a Division of Ritter Pfaudler Corporation, Buckingham, N.J. Also, the ionic salt used in the fiberglass barrier layer mixed with rubidium and cesium is an ionic resin part No. PP-2025 and obtained from the same company. While these particular polyvinylpyridine compounds work very well in the illustrated embodiment, it will be understood that polyvinylpyridines from other suppliers will work in the same manner. The natural elements such as indium, rubidium, cesium, etc., can be obtained by any suitable means.

While several specific embodiments of the invention have been illustrated herein, it will be understood that variations and modifications of the invention may be effected without departing from the spirit and scope of the novel concepts disclosed and claimed herein.

The invention is claimed as follows:

1. A battery cell construction comprising in combination, a housing having first and second spaced apart inner portions and a passage through said housing in registry with said first inner portion, first and second anode layers each containing lithium and positioned within said housing at said first inner portion, a porous current collector element positioned between said first and second anode layers, conductor means extending through said passage and connected to said current collector element, cathode means positioned within said housing at said second inner portions and spaced from said anode layers, and an ion conductive layer positioned in said housing between said anode layers and said cathode means, said ion conductive layer including a polymer which has been reacted with iodine at a temperature in excess of 100°C.

2. The battery cell construction according to claim 1, wherein said polymer is polyvinylpyridine.

3. The battery cell construction according to claim 1, wherein said polymer is polyvinylpyrene.

4. The battery cell construction according to claim 1, wherein said porous current collector element is formed of a nickel screen.

5. The battery cell construction according to claim 1, wherein said housing further includes a third inner portion spaced from said first inner portion in a direction diametrically opposed thereto with respect to said second inner portion, second cathode means positioned within said housing at said third inner portion and spaced from said anode layers, and a second ion conductive layer positioned in said housing between said anode layers and said second cathode means, said second ion conductive layer including a polymer which has been reacted with iodine at a temperature in excess of 100°C.

6. A battery cell construction comprising in combination, a housing of non-conductive material, said housing having a first bore of a given diameter extending partially through said housing, a second bore of greater diameter than said first bore extending from the top of said housing and terminating intermediate of said housing, said first bore and said second bore forming an annular ridge within said housing, lithium anode means positioned within said first bore, a first layer positioned over said lithium anode means, said first layer formed of a polyvinylpyridine and iodine mixture, a second layer positioned over said first layer, said second layer being formed of a mixture of carbon and iodine, cathode electrode means positioned over said second layer to form an electrical contact for said cathode over said second bore, and an electrical lead extending through said housing and connected to said lithium anode means to form the electrical contact for said anode means.

7. The battery cell construction of claim 6 wherein said lithium anode means is formed of a first disc of lithium positioned immediately adjacent said end wall of said housing, said first disc being of a predetermined thickness, a second disc of lithium positioned over said first disc, said second disc having a thickness greater than said first disc, and a nickel screen positioned between said first and second discs of lithium, said electrical lead extending through said housing being connected to said nickel screen.

8. The battery cell construction of claim 6 further including a film positioned between said first and second layers, said film being formed of a fiberglass membrane impregnated with ionic exchange resins of polyvinylpyridine to which are added compounds of rubidium iodide or cesium iodide, or tetramethyl ammonium iodide, or a mixture thereof.

9. The battery cell construction of claim 8 wherein said rubidium iodide and said cesium iodine are of equal parts.

10. The battery cell construction of claim 6 wherein said cathode electrode means is formed of a stainless steel or nickel disc positioned over said second layer and secured within said second bore by epoxy, and a flexible cover disc positioned over said stainless steel disc and in contact therewith to provide the cathode electrode for the battery cell.

11. The battery cell construction of claim 6 wherein said first layer is formed of a mixture of polyvinylpyridine and iodine and one of the compounds selected from the group consisting of rubidium iodine, cesium iodine, or tetramethyl ammonium iodine.

12. The battery cell construction of claim 6 wherein said second layer is formed of a mixture of at least two parts of iodine and one part carbon.

13. The battery cell construction of claim 6 wherein said cathode electrode means includes a fibrous stainless steel layer over said second layer and a metal contact disc in contact with said fibrous stainless steel layer thereby improving the electrical conductivity between said second layer and said cathode electrode.

14. The battery cell construction of claim 6 wherein said cathode electrode means includes a layer of stainless steel fibers to provide good electrical contact between said cathode electrode means and said second layer.

15. The battery cell construction of claim 6 wherein said first layer is formed of a mixture of polyvinylpyridine or polyvinylpyrene and iodine and a mixture or complex of polymer and iodine is produced by reacting the polymer and iodine at an elevated temperature in excess of 100°C.

* * * * *